United States Patent [19]

Faessen et al.

[11] Patent Number: 4,695,129
[45] Date of Patent: Sep. 22, 1987

[54] VIEWER HAVING HEAD MOUNTED DISPLAY UNIT FOR CINERAMA PICTURES

[75] Inventors: Louis M. H. Faessen; Giok D. Khoe, both of Eindhoven, Netherlands

[73] Assignee: U.S. Philips Corp., New York, N.Y.

[21] Appl. No.: 611,061

[22] Filed: May 17, 1984

[30] Foreign Application Priority Data

May 26, 1983 [NL] Netherlands .................... 8301864

[51] Int. Cl.⁴ ............................................. G02B 6/06
[52] U.S. Cl. .............................. 350/96.25; 340/795;
  353/7; 358/3; 358/88; 358/901; 350/96.26;
  350/133; 350/137; 350/576
[58] Field of Search ............... 350/96.10, 96.18, 96.24,
  350/96.25, 96.26, 133, 137, 486, 576, 145;
  340/705, 794, 795, 980; 353/7, 8, 9; 358/3, 88,
  901

[56] References Cited

U.S. PATENT DOCUMENTS

| | | | |
|---|---|---|---|
| 2,955,156 | 10/1960 | Heilig ...................................... | 358/88 |
| 3,216,778 | 11/1965 | Davies et al. ......................... | 350/145 |
| 3,267,209 | 8/1966 | Nagamori ........................... | 350/96.25 |
| 3,467,774 | 9/1969 | Bryant ................................. | 350/96.27 |
| 3,585,282 | 6/1971 | Allan ................................... | 350/96.25 |
| 3,609,016 | 9/1971 | Jampolsky ........................... | 350/96.25 |
| 3,670,097 | 6/1972 | Jones ................................... | 358/901 |
| 3,687,534 | 8/1982 | Waldurche de Montremy ........................ | 350/96.25 |
| 3,712,724 | 1/1973 | Courtney-Pratt .................... | 350/96.27 |
| 3,748,016 | 7/1973 | Rossire ............................... | 350/96.25 |
| 3,824,535 | 7/1974 | Rover, Jr. ............................ | 350/96.27 |
| 3,833,300 | 9/1974 | Rymes ................................. | 350/96.27 |
| 3,990,778 | 11/1976 | Magee et al. ........................ | 350/96.25 |
| 4,015,115 | 3/1977 | Corcoran ............................. | 350/96.25 |
| 4,248,213 | 2/1981 | Landre ................................. | 350/96.26 |
| 4,253,447 | 3/1981 | Moore et al. ........................ | 350/96.26 |
| 4,310,849 | 1/1982 | Glass ................................... | 358/88 |
| 4,330,169 | 5/1982 | Kantor ................................. | 350/96.26 |
| 4,340,878 | 7/1982 | Spooner et al. ..................... | 340/705 |
| 4,347,508 | 8/1982 | Spooner ............................... | 340/705 |
| 4,349,815 | 9/1982 | Spooner ............................... | 340/705 |
| 4,425,025 | 1/1984 | Sunaga ................................. | 350/96.26 |
| 4,427,977 | 1/1984 | Carollo et al. ....................... | 340/702 |
| 4,521,074 | 6/1985 | Kalaugher ........................... | 350/145 |

*Primary Examiner*—William L. Sikes
*Assistant Examiner*—F. González
*Attorney, Agent, or Firm*—F. Brice Faller

[57] ABSTRACT

Viewer comprises a picture generating device which supplies black/white or color pictures, an optical fibre or fibre bundle for the transport of the optical pictures to a user who wears a display unit on the head. The display unit comprises a spectacles-like frame and optical means, such as lenses, grey filters, or transparent screens for making the pictures visible to the user. The user sees a "wide-screen" picture, but the actual dimensions of the picture are no more than a few centimeters. For the display of cinerama pictures the display unit comprises an angular position detector which supplies a signal in which the orientation of the head of the user is detected. The picture generating device then supplies a picture which is associated with the relevant orientation.

9 Claims, 12 Drawing Figures

VIEWER HAVING HEAD MOUNTED DISPLAY UNIT FOR CINERAMA PICTURES

BACKGROUND OF THE INVENTION

The invention relates to a viewer or device for the display of (moving) pictures for individual persons.

The annoyance imposed by a television viewer on his environment in the form of pictures (and sound) is known. It is also known that photographers and super-8 movie enthusiasts like to watch their creations in a large format, so that other persons must also watch, usually against their will, the display (projection) of such creations. Apparatus are now available for the display of pictures which can be individually watched. However, these pictures have a small format. The display of small format pictures (for example 10×15 cm) will not be satisfactory for such hobbyists and spoiled television viewers (66 cm picture diagonal).

SUMMARY OF THE INVENTION

It is the object of the invention to provide a viewer or device for the display of pictures for individual persons which enables slide, film or television pictures to be washed individually and in a large format, without burdening the surroundings with these pictures.

It is a further object of the invention to display pictures in a large format in stereo for an individual viewer and to display cinerama pictures (very wide picture format) where in reaction to changes of the viewing direction of an individual viewer, a part of the cinerama picture which is associated with the relevant viewing direction is displayed.

To this end, the viewer in accordance with the invention comprises a bundle of fibres for the transmission of pictures from an entrance face to an exit face of the fibre bundle, a picture generating device for projecting pictures onto the entrance face, and a spectacles-like frame incorporating a box-shaped holder in which two viewing apertures are formed and in which the exit face of the fibre bundle is secured. Optical means are arranged between said one end and the apertures for viewing the pictures being transmitted via the fibre bundle, the frame comprising fixing means for keeping the frame in position on the head of a viewer.

DETAILED DESCRIPTION OF THE PREFERRED EMBODIMENT

Figure 1:
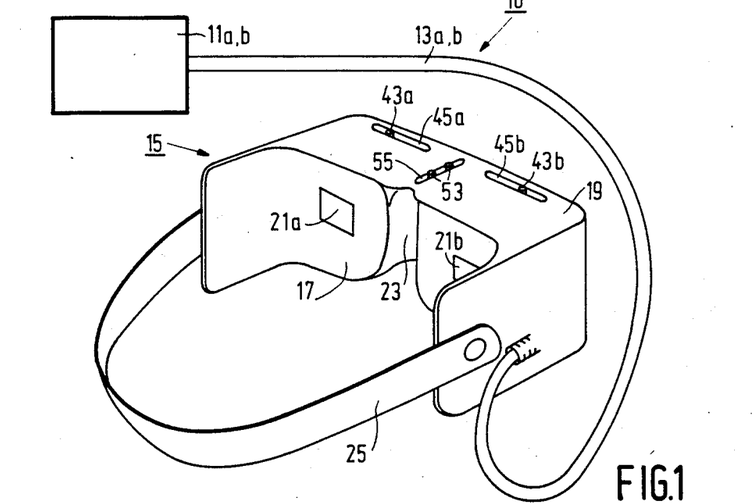
FIG. 1 diagrammatically illustrates the principle of an embodiment of a head-mounted viewer in accordance with the invention, FIG. 2 diagrammatically shows an embodiment of a display unit in accordance with the invention, FIG. 3 diagrammatically shows a further embodiment of a display unit in accordance with the invention.

Referring to FIG. 1, the viewer 10 comprises a picture generating device 11, an optical fibre or fibre bundle 13 made of glass or plastics, and a display unit 15. The picture generating device 11 may be a (small-screen) television or a film projector which produces a (moving) black/white or colour picture. Via the optical fibre 13, the picture generated is transmitted to the display unit 15, where it is displayed. For transmitting the picture generated, use can be made of a single optical fibre as known from Proceedings of the IEEE, Vol. 71, No. 2, February 1983, pages 208–220, but use can alternatively be made of a bundle of fibres as known from a publication in "Patents and Licensing", April 1982, page 26. The display unit 15 comprises a spectacles-like frame 17 which incorporates a box-shaped holder 19 in which two viewing apertures 21a, b are formed. Between the viewing apertures 21a, b there is formed a recess 23 which is adapted to the shape of the human nose. The frame 17 further comprises fixing means 25 in the form of an elastic band for securing the display unit 15 on the head of a user (not shown).

Figure 2:
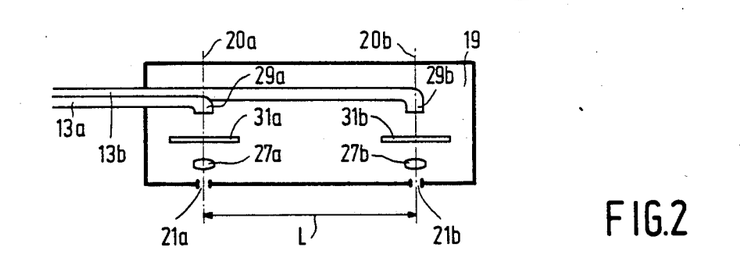

FIG. 2 diagrammatically shows an embodiment of the display unit 15 in accordance with the invention. The optical fibre bundle 13, preferably consisting of two sub-bundles 13a and b, the box-shaped holder 19 and the viewing apertures 21a, b can be distinguished. The pictures transmitted via the fibre bundles 13a and 13b are projected onto the retinas of the eyes of the viewer by respective lens systems 27a, b and the viewing apertures 21a, b. Each lens system 27a, b may comprise (for each fibre bundle 13a and b) a single lens or several lenses; cylindrical lenses can be used in order to display a transmitted picture which has been compressed in one direction (as in "wide-screen movies") in the correct (wide-screen) format again. In order to adapt the light intensity of the transmitted picture to the user's requirements, adjustable grey filters 31a, b are arranged between the ends 29a, b of the fibre bundles 13a, b and the lens system 27a, b.

Figure 3:
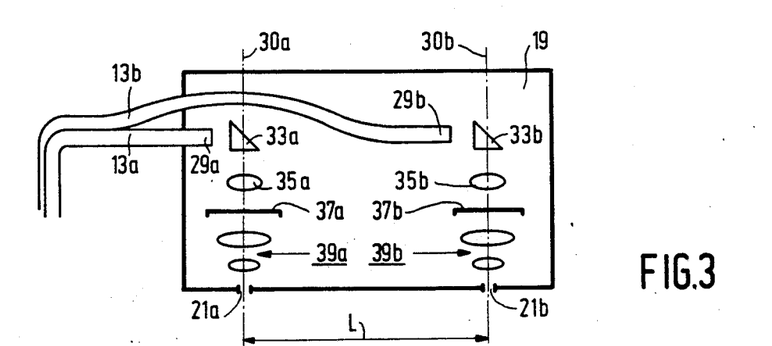

FIG. 3 shows a further embodiment of a display unit 15 in accordance with the invention. The fibre bundles 13a, b, the box-shaped holder 19, the viewing apertures 21a, b and the fibre ends 29a, b can again be distinguished. The pictures transmitted via the fibre bundles 13a, b are projected onto transparent screens 37a, b via prisms 33a, b and lenses 35a, b. The user can watch these screens via the zoom lens systems 39a, b. The distance L between the optical axes 20a, b; 30a, b of the lens systems 27a, b and the optical systems 33a, b; 35a, b; 37a, b and 39a, b should be adjustable in order to adapt the viewer to the distance between the pupils of the eyes of the user.

Figure 4:
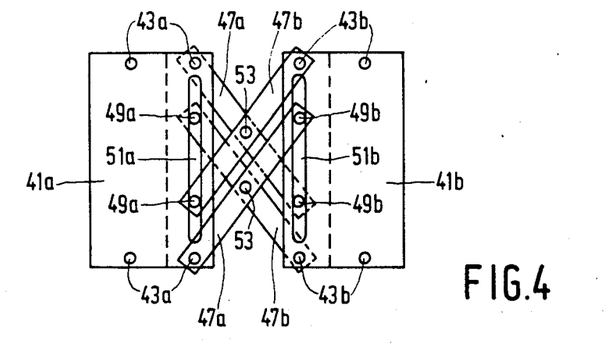
FIG. 4 shows a mechanism for the adjustment of the distance of the optical means in the display unit, FIG. 5 diagrammatically shows an embodiment of a picture generating device in accordance with the invention.

FIG. 4 shows an embodiment of a simple mechanism for such an adjustment. The optical components a, b mentioned with respect to FIGS. 2 and 3 are mounted on two supports 41a, b. It will be apparent that the ends 29a, b are also secured on the supports 41a, b, because the position of these ends may not change with respect to the optical components a, b. The supports 41a, b comprise guide pins 43a, b which engage slots 45a, b formed in the box-shaped holder 19 (only two are shown), so that the pins 43a, b are guided by the slots 45a, b. The supports 41a, b are coupled to one another by means of arms 47a, b the arms 47a, b being pivotably secured on the one side to the pins 43a, b affixed to the supports 41a, b, and on the other side of pins 49b, a which engage slots 51b, a. Each arm 47a is pivotably connected in the centre to an arm 47b by way of a pin 53. The two pins 53 are guided in a slot 55 formed in the holder 19. The described construction imposes displacement of equal magnitude on the two supports 41a, b with respect to the pins 53 in the slot 55, the optical axes 20a, b and 30a, b of the optical components mounted on the supports (see FIGS. 2 and 3) thus being shifted parallel to one another. When one of the pins 43a, b or 53 is partly threaded, a knob can be mounted thereon so that the adjusted position of the supports 41a, b can be fixed by the tightening of the knob. It will be apparent that the display unit 15 which is diagrammatically shown in FIGS. 2 and 3 is suitable for the display of stereo pictures.

Figure 5:
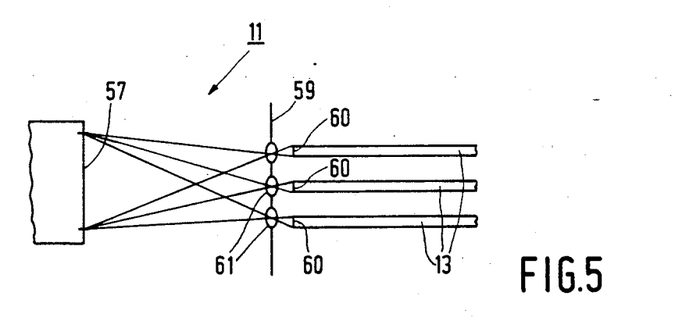

FIG. 5 diagrammatically shows a picture generating device 11. The picture to be transmitted via fibres 13 is projected onto a screen 57, which may be a (small-screen) television screen or a (transparent) projection screen, in order to be imaged on the entrance face of each of the fibres 13 via a matrix 59 of lenses. (It is to be noted that the fibre denoted by the reference numeral 13 may be a single fibre as a bundle of fibres). It will be apparent that although a one-dimensional row of lenses 61 of the matrix 59 and a similar row of fibres 13 are shown, the matrix may extend in two dimensions, so that a multitude of fibres 13 and hence a corresponding number of display units 15 can be connected to one picture generating device 11. The lenses used in the matrix 59 are preferably so-called "grin rod" lenses, because such lenses can be comparatively simply mounted (stacked).

Figure 6:
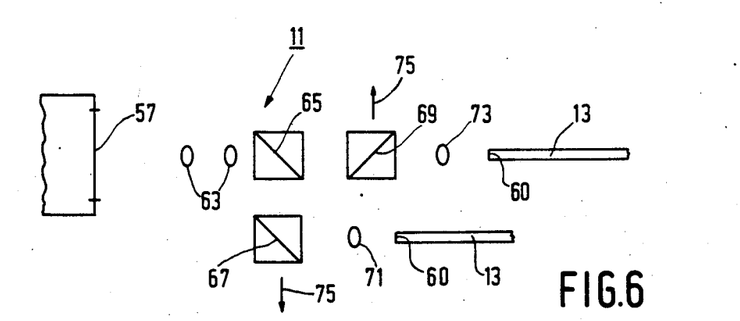
FIG. 6 shows a further embodiment of a picture generating device in accordance with the invention.

FIG. 6 shows a further possibility of connecting a number of fibres 13 to a picture generating device 11. The picture produced on a screen 57 generates a beam of parallel light rays via lenses 63, said beam being split by a first semi-transparent mirror 65, a second semi-transparent mirror 67, and a third semi-transparent mirror 69 into four parallel beams, each of which is projected by a lens 71, 73 (or lens matrix 59 of FIG. 5) onto the entrance face 60 of fibres 13 (only two of the four lenses and fibres are shown, the other two being symbolically denoted by arrows 75). It will be apparent that for the stereoscopic display of pictures, two picture generating devices (a, b) are required, one device generating a picture for the left eye while the other device generates a picture for the right eye.

Figure 7:
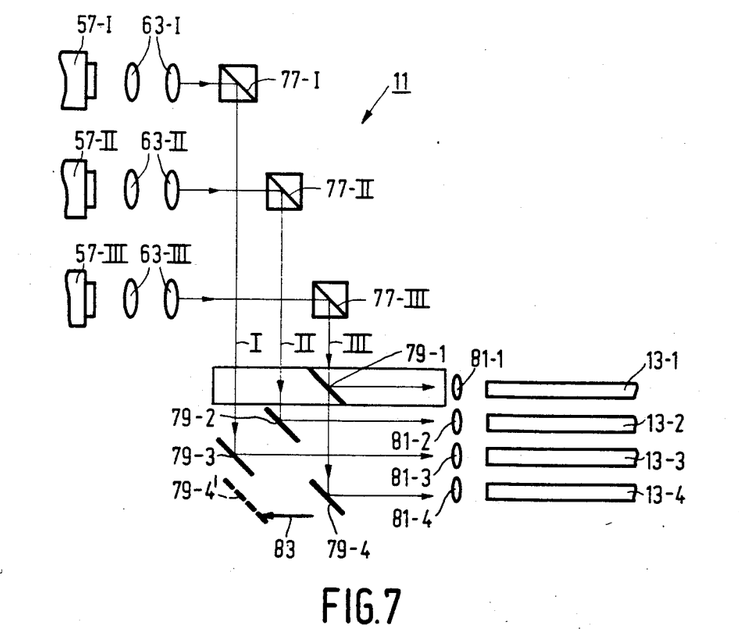
FIG. 7 shows a picture generating device in accordance with the invention which comprises a picture selection facility.

FIG. 7 diagrammatically shows an embodiment of a picture generating device 11 where the user (users) can independently make a selection from three different programs. The number three is merely an example and a larger number is also feasible. The picture generating device 11 in this embodiment comprises three display screens 57I, 57II, 57III (for example, of three small-screen television receivers, each of which is tuned to a different station). In front of each screen 57I, II, III there are arranged lenses 63I, II, III, respectively, which convert light emitted by a screen 57I, II, III into a parallel light beam which is incident on mirrors 77I, II, III, respectively. Thus, three parallel light beams I, II, and III which lie in one plane are formed, said beams being diagrammatically denoted by arrows in the Figures. Light beam III is imaged on the entrance face 60 of fibre 13-1 via a semi-transparent mirror 79-1 and a lens 81-1. The user wearing the display unit 15 connected to the fibre 13-1 thus watches the program III. The light beam III which is transmitted by the mirror 79-1 is projected onto the entrance face of the fibre 13-4 via the (semi-transparent) mirror 79-4 and the lens 81-4. User 4 then also sees the program III. The user can select program I or II by displacing the mirror 79-4 to the position 79-4' as indicated by an arrow 83. When the mirror 79-4 has been moved to the position 79-4', the user watches the program I, because the light beam I which is transmitted by the semi-transparent mirror 79-3 is projected onto the entrance face of the fibre 13-4. It will be apparent that the users 2 and 3 utilize the fibres 13-2 and 13-3 in order to watch the programs II and I, respectively. The users can select another program by suitable displacement of the mirrors 79-1, 79-2, 79-3 or 79-4. Each mirror 79-1, 2, 3, 4 is preferably composed of two rectangular, elongate prisms, the semi-transparent mirror 79-1, 2, 3, 4 being provided on the contacting oblique sides. The prisms forming the mirrors 79-1, 2, 3, 4 can be arranged against one another (when use is made of an intermediate liquid having an appropriate refractive index), so that the prisms of one mirror slide across the prisms of the (two) neighbouring mirror (mirrors) during program selection. The direct contact and the use of a liquid having an appropriate refractive index will counteract reflections and hence loss of light. Similarly, the mirrors 77I, II and III may form one integral unit, a straight side of a prism where the reflective layer is provided on the oblique side then being arranged directly against a side of the prisms of the mirror 79I in order to counteract loss of light due to reflections.

Figure 8:
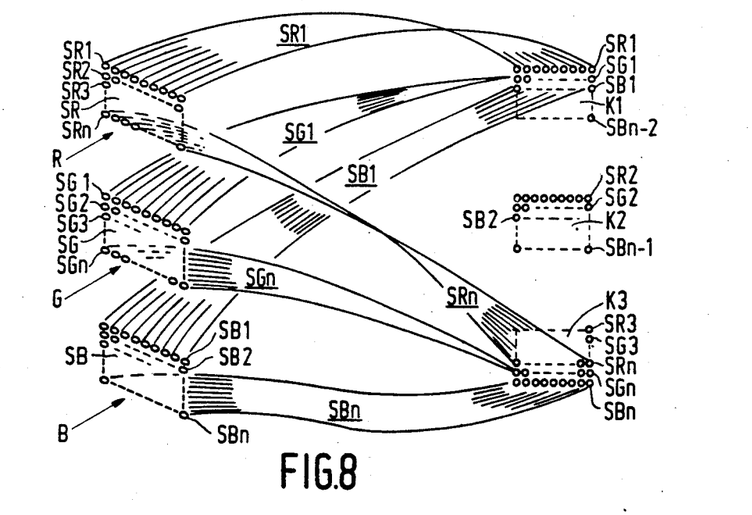
FIG. 8 shows an embodiment of a part of a picture generating device for generating colour pictures.

When colour television pictures are to be watched via the viewer, moires occur in the colour picture generated. The television picture is generated by means of three regular patterns of phosphors (red, green and blue) which are irradiated via a hole mask. When this regular colour pattern is transmitted via a fibre bundle 13 (a regular stack of some hundreds of thousands of fibres), moires will appear if the two regular patterns are not adapted to one another. FIG. 8 shows a part of a picture generating device 11 in which the described problem is solved. The R, G and B signals (red, green and blue signals used to drive the colour television picture tube) are now used to drive three separate monitors, each of which produces a monochromatic picture R(red), G(green) and B(blue). These monitors do not comprise a hole mask so that they produce a "uniform" picture (that is to say without a pattern). A stack $S_R$, $S_G$, $S_B$ of ribbon-like fibre arrays (hereinafter referred to as "fiber ribbons") is arranged directly against the display screen of each monitor (small-screen, for example $2 \times 1.5$ cm). The stacks $S_R$, $S_G$ and $S_B$ thus receive a monochromatic red, green and blue picture, respectively, as indicated by arrows R, G and B in FIG. 8. Each stack $S_R$, $S_G$ and $S_B$ comprises n stacked ribbons, n being an integer, for example 750, and a multiple of three, and each ribbon comprises, for example, 1000 adjacently arranged, parallel fibres. The first ribbon of each stack $S_R$, $S_G$ and $S_B$ has an index 1 and an end $S_{R1}$, $S_{G1}$ and $S_{B1}$ thereof is fed to a further stack K1 and is stacked in this sequence as is diagrammatically shown in FIG. 8. The ends of the first ribbons $S_{R1}$, $S_{G1}$ and $S_{B1}$ actually form the first coloured line of a picture formed by the stack K1. The ends of each second ribbon of the stacks $S_R$, $S_G$ and $S_B$ are fed to a stack K2, where they also form a first coloured line. For the sake of clarity, this has been omitted from FIG. 8. It will be understood that the ends of each third ribbon of the stacks $S_R$, $S_G$ and $S_B$ are fed to a third stack K3, where they form a first coloured line. Subsequently, the end of each ribbon having the index 1+3m (where m is an integer and 1+3m)<n) of each stack $S_R$, $S_G$ and $S_B$ is fed to the stack K1, the ends of the ribbons bearing the index 2+3m (where m is an integer and 2+3m<n) being fed to the stack K2, while the ends of the ribbons bearing the index 3m (where 3m is an integer and 3m<n) are fed to the stack K3. FIG. 8 shows the three ribbons $S_{Rn}$, $S_{Gn}$ and $S_{Bn}$ which form the last coloured line of the stack K3. In the stacks K1 and K2 the ends of the ribbons $S_{Bn-2}$ and $S_{Bn-1}$, respectively, form the lowest layer of fibres.

The part of a picture generating device which is shown in FIG. 8 thus produces three identical colour pictures, each of which contains an equal number of pixels without moires. Each of the stacks K1, K2, K3 is suitable to produce a picture via the picture generating devices 11 shown in FIGS. 5, 6 and 7. Obviously, it is alternatively possible to interleave the ends of the ribbons of the stacks $S_R$, $S_G$ and $S_B$ in order to form a single stack, which reproduces a three times larger number of pixels than one of the stacks K1, K2 and K3.

Figure 9:
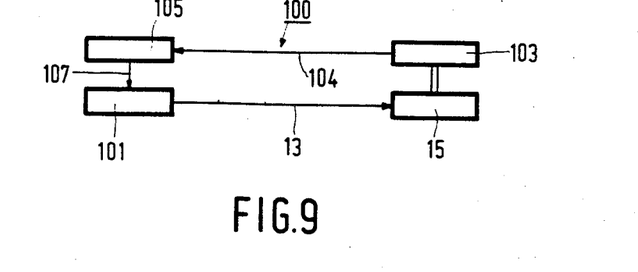
FIG. 9 illustrates the principle of a head-mounted viewer for cinerama pictures.

In a preferred embodiment of a viewer 100 in accordance with the invention, a cinerama picture is displayed for the user; when the user shifts his head, a picture associated with the head position (shifted position) is displayed via the head-mounted display unit 15. FIG. 9 shows the block diagram of a viewer 100 for the display of cinerama pictures. The viewer 100 comprises a picture generating device 101, one or more optical fibres or fibre bundles 13, a display unit 15 to which an angular-shift position detector 103 is mechanically coupled, and a control unit 105 which applies, via a connection 107, a control signal to the picture generating device 101 in order to produce the picture associated with the relevant position of the head of the user. The detector 103 is preferably a glass fibre gyroscope. These gyroscopes are known per se and are described, for example, in Proceedings of the Society of Photo-Optical Instrumentation Engineers, Vol. 77, Mar. 22-23, 1976, pages 110-115, by V. Vali and R. Shorthill: Fiber laser gyroscopes, and in "Electronica", January 1982, No. 1, pages 23-25: "Glasvezelgyroscoop". The described gyroscope can be completely accommodated in the holder 19; if necessary, the fibres required for forming the optical path of the gyroscope can be accommodated in the holder and the band of the fixing means 25.

Figure 10:
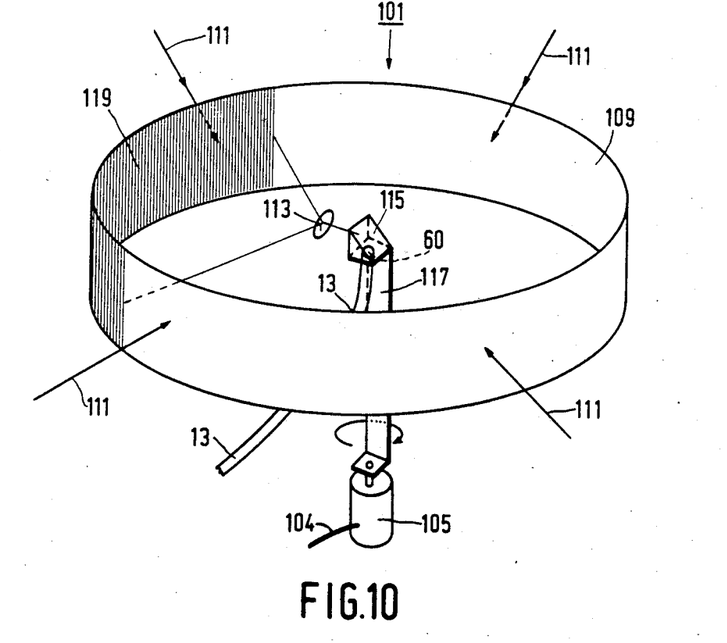
FIG. 10 shows an embodiment of a picture generating device for a head-mounted viewer as shown in FIG. 9.

FIG. 10 shows an embodiment of a picture generating device 101 and a control unit 105. The device 101 comprises in principle an annular transparent screen 109 on which a cinerama picture (360° or all-around picture) is projected from the outside, as indicated by four arrows 111. This can be done by known means such as film projectors, but it is alternatively possible to compose an all-around picture by means of television techniques and optical fibre ribbons (as described with reference to FIG. 8). It will be evident that the invention is not absolutely necessarily limited to a 360° picture and that it can be used equally well for pictures covering a smaller angle (for example, 240°). The picture generating device 101 operates as follows: a part (119) of the all-around projected picture is imaged on the entrance face 60 of a fibre (bundle) 13 via a lens 113 and a reflective prism 115. The user of the display unit (not shown) which is connected to the fibre 13 will observe this sub-picture 119 (denoted by vertical lines in FIG. 10). When the user changes the angular position (viewing direction) of his head, the detector 103 (the optical gyroscope) outputs a signal which is a measure of the angular shift. This signal is applied, via a line 104 (possibly after amplification), to the control unit 105 which is formed by an electric motor 105 in the present embodiment. The motor 105 then rotates a bracket 117, which is connected at one end to the shaft of the motor 105 and at the other end to the prism 115 and the lens 113 (the actual connection of the prism 115 and the lens 113 has been omitted for the sake of clarity), so that a picture section which is adapted to the new angular orientation (viewing direction of the user's head is imaged on the entrance face 60 of the fibre 13 due to the rotation of the prism 115 and the lens 113.

Figure 11:
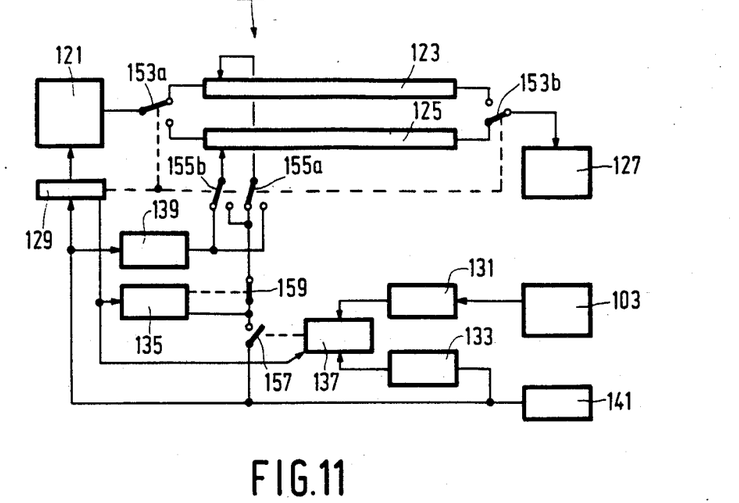
FIG. 11 shows a preferred embodiment of a picture generating device for the head-mounted viewer of FIG. 9, and FIG. 12 diagrammatically shows a cinerama picture in order to illustrate the operation of the picture generating device shown in FIG. 11.
Figure 12:
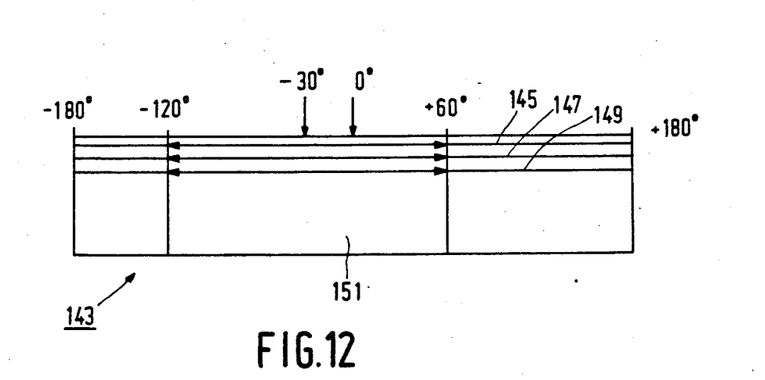

FIG. 11 shows a preferred embodiment of a picture generating device 101 in accordance with the invention for mainly comprises a picture generator 121 which producing a picture in the form of video signals, such as a video disc player or a video cassette recorder, two delay lines 123 and 125 in the form of shift registers (for example, charge coupled devices), a monitor 127, various counters 129, 131, 133 and 135, a comparator 137, a pulse frequency divider 139, and a pulse generator 141. The operation of the picture generating device 101 shown in FIG. 11 will be described also with reference to FIG. 12. FIG. 12 shows a picture 143 which is stored in the picture generator 121. The picture is to be considered as an all-around (360°) picture which is cut in one location so as to be flattened. The picture 143 is linewise stored in the picture generator 121; FIG. 12 shows three lines 145, 147 and 149 by way of example. Via the lines 145, 147 ... etc. of the picture 143, only a part 151 need be made visible to the user; this part 151 (for example, from −120° to +60° of the 360°) depends on the position of the head of the user. Only a part of each line 145, ... etc. need be displayed. In principle this is done as follows: the video signals of a first line (for example, 145) are input completely into a first shift register 123 in which only the video signals corresponding to the desired part (within the sub-picture 151) are stored. Subsequently, the video signals of a second line (147) are applied to the second shift register 125, which also stores only the desired part. At the same time the line segment stored in the first shift register 123 is displayed on the monitor 127. The first shift register 123 is subsequently written into again and at the same time the contents of the second shift register 125 are displayed via the monitor 127. The display screen of the monitor (which may also comprise a flat display screen) is connected to a display unit 15 via a fibre 13 in one of the described manners.

For realizing the above principle, the pulse generator 141 supplies pulses at a frequency which is twice as high as the number of picture elements to be stored in a shift register 123 or 125, because in the present example a line 145, 147, ... etc. comprises twice as many pixels as the segment to be displayed in sub-picture 151. The pulses are applied to a counter 129 which is capable of counting a maximum number of pulses equal to the number of picture elements of a line 145, after which the count is restarted. The pulses are also applied to the picture generator 121, so that the picture elements are applied to the shift register 123 via the switch 153a. When the counter 129 reaches its maximum count and subsequently starts counting from zero again (in reaction to the next pulse), it outputs a control signal to the switches 153a, b and 155a, b, which are switched over in response thereto. As a result, a next picture line is presented to the register 125, via the switch 153a, and the register 123 can be read via the switch 153b. Via pulse divider 129 (divide by two), read pulses are input to one of the two registers 123 or 125, so that one of the registers is read at the same time (at a lower frequency) that an entire line is being input or written into the other register. In the state shown, register 123 will be written and register 125 will be read. In order to write the correct part of a picture line, the following facilities are provided: the angular-position detector 103, a position counter 131 which is connected thereto and whose count is a measure of the orientation of the head of the user, a counter 133 whose count corresponds to that of the counter 129 and is a measure of the position of a picture element on a picture line, said picture element being input to the register 123 at that instant, a comparator 137 which compares the two counts of the counters 131 and 133 and which closes a switch 157 as soon as the counts correspond. When the switch 157 is closed, a counter 135 receives pulses which originate from the pulse generator 141 and which are also applied to the register 123 in order to enable the writing of the picture elements output by the picture generator 121. As soon as the counter 135 reaches its highest count, corresponding to the number of picture elements to be written into the register 123, the counter 135 opens a switch 159, so that no further picture elements can be written into the register 123. The line segment determined by the angular position of the user's head has thus been written into the register 123. The beginning of said line segment is determined by the count in the counter 131. The end of the line segment is defined by the number of pulses counted by the counter 135 until the switch 159 is opened. When the counter 121 reaches its highest count after a number of further clock pulses, the switches 153a, b and 155a, b are switched over at that instant and a reset pulse is applied to the comparator 137 and the counter 135, so that the switches 157 and 159 are opened and closed, respectively. In this situation, the register 123 is read at the lower pulse frequency produced by the pulse divider 139, and the register 125 is written into, as soon as the counter 133 reaches the count determined by the counter 131 and closes the switch 157, until the switch 135 opens the switch 159.

It is to be noted that the operation of the counter 129 is the same as that of the counter 133, so that these two counters may be replaced by a single counter. It is also to be noted that, if the picture generator 121 supplies the signals "red", "green" and "blue", the electronic circuitry shown in FIG. 11 must be provided in triplicate, for which purpose charge shift registers (charge coupled devices) can be advantageously used. It is also to be noted that in the case of cinerama pictures cylindrical lenses can be advantageously used in the display unit in order to enable "wide-screen" observation. The described viewer can be very effectively combined with the known headphone. The changing of programs is very simple in the picture generating device 101 shown in FIG. 11, i.e. by replacing the picture generator 121 with another generator. This can be simply performed by means of a few switches. It will be evident that every user should have his own angular position detector 103 and picture generating device 101 (with the exception of the picture generator 121). Several users can simultaneously use the same picture generator 121, each user still watching his own picture (depending on the viewing direction, i.e. position of the head).

The described viewer can be used not only by said users, but applications can also be found in aeroplanes, touring cars, hospitals and the like where a large number of people are "forced" to be present for a considerable period of time and their stay should not be annoying to other persons. The invention is also very suitable for use in the training of pilots, navigators or drivers in flight, navigation or driving simulators.

What is claimed is:

1. Viewer for displaying cinerama television pictures and the like to an individual person comprises
   optical fiber bundle means for the transmission of pictures, said bundle having entrance face means onto which the pictures are projected and exit face means to which the pictures are transmitted;
   picture generating means for projecting cinerama pictures onto the entrance face means;
   a display unit comprising a box shaped holder in which said exit face means of the bundle means is secured, said holder having two viewing apertures formed therein and optical means arranged between said apertures and said exit face means for viewing transmitted pictures, said display unit further comprising a fiberoptic gyroscope for detecting the angular position of said person's head, said gyroscope being coupled to output a control signal which is a measure of the angular rotation of the display unit;
   control means for selecting a sub-picture of a cinerama picture generated by said picture generating means in response to receipt of said control signal representing the angular rotation of the display unit;
   fixing means attached to the display unit for keeping the unit in position on the head of said person.

2. A viewer as claimed in claim 1, characterized in that the picture generating means comprises projection means and an annular transparent projection screen on which a cinerama picture can be projected by means of the projection means, a sub-picture thereof being imaged on the entrance face of the fibre bundle end by a lens system, the control unit comprising an electric motor for rotating at least the lens system together with the end of the fibre bundle, said electric motor receiving the control signal from the detector.

3. A viewer as claimed in claim 1, characterized in that the picture generating means comprises a picture generator for the line-wise and sequential supply of picture elements of a picture, and also comprises delay and storage means for the storage of a part of a picture line and for the delayed output of the picture elements stored in said means.

4. A viewer as claimed in claim 3, characterized in that the storage and delay means comprise two storage registers which are alternately and alternatively driven with a high pulse frequency during a part of the line period of a picture line and with a lower pulse frequency for the reading out of a register during the entire line period of a picture line.

5. A viewer as claimed in claim 4, characterized in that there is provided a first counter whose position is a measure of the angular orientation of the display unit, and a second counter whose position is a measure of the position on a picture line of a picture element inputted to a register by the picture generator, both counters being connected to a comparator whose output controls the supply of control pulses to the register for the storage of the picture elements.

6. A viewer as claimed in claim 5, characterized in that the control pulses ae applied to a third counter which counts the number of picture elements stored in the register and which interrupts the supply of control pulses to the register when the maximum number of picture elements to be stored in a register is reached.

7. Viewer for displaying television pictures and the like to an individual person comprises
- optical fiber bundle means for the transmission of pictures, said bundle means comprising a plurality of optical fiber bundles, each having an entrance face onto which the pictures are projected, and an exit face to which the pictures are transmitted;
- picture generating means comprising a plurality of picture generators, a picture distributor having adjustable optical means for establishing a desired optical connection between a fiber bundle and one of the picture generators, and a plurality of lenses arranged between the distributor and respective fiber bundle entrance faces;
- a display unit comprising a box shaped holder in which the exit faces of the bundles are secured, said holder having two apertures formed therein and optical means arranged between said apertures and said exit faces for viewing the transmitted pictures;
- fixing means attached to the display unit for keeping the unit in position on the head of said person.

8. A viewer as claimed in claim 7, characterized in that the adjustable optical means comprise displaceable, semi-transparent mirrors which can be arranged in parallel light beams which are formed from light emitted by the picture generator by means of lenses which are arranged between the picture generators and the mirrors.

9. Viewer for displaying television pictures and the like to an individual person comprises
- optical fiber bundle means for the transmission of pictures, said bundle having entrance face means onto which the pictures are projected and exit face means to which the pictures are transmitted;
- picture generating means comprising three picture generators for separately generating three sub-pictures in the primary colors red, green, and blue, of the color picture, each picture generating means being coupled to a stack consisting of n layers of optical fibers where n is an integer which is a multiple of three, each layer comprising a number of parallel, adjacent optical fibers which are combined so as to form a ribbon, ends of the ribbons of the three stacks being combined so as to form a further stack, the first layer and the $(1+3m)^{th}$ layer thereof being formed by ends of ribbons of a first stack, where m is an integer and $1+3m \leq n$, the second layer and the $(2+3m)^{th}$ layer being formed by ends of ribbons of the second stack, where m is an integer and $2+3m < n$, and the third layer and the $(3m)^{th}$ layer being formed by ends of ribbons of the third stack, where m is an integer and $3m \leq n$, so that the further stack produces a color picture from the three sub-pictures formed with the three primary colors;
- a display unit comprising a box shaped holder in which the exit faces of the bundles are secured, said holder having two apertures formed therein and optical means arranged between said apertures and said exit faces for viewing the transmitted pictures;
- fixing means attached to the display unit for keeping the unit in position on the head of said person.

* * * * *